3,201,371
PROCESS FOR THE PRODUCTION OF EUPOLY-
OXYMETHYLENES WITH THE AID OF CATA-
LYTIC FILLERS
Jürgen Behrends, Hanau am Main, and Otto Schweitzer,
Königstein, Taunus, Germany, assignors to Deutsche
Gold- und Silber-Scheideanstalt vormals Roessler,
Frankfurt am Main, Germany
No Drawing. Filed Nov. 17, 1960, Ser. No. 69,817
Claims priority, application Germany, Nov. 20, 1959,
D 31,926
11 Claims. (Cl. 260—67)

The present invention relates to a novel class of catalysts for use in the production of eupolyoxymethylenes.

The object of the present invention is to provide a new type of catalyst for the production of eupolyoxymethylenes.

Eupolyoxymethylenes can be produced according to many different processes. Among such processes there is, for example, the technique of polymerizing monomeric formaldehyde in an inert solvent in the absence of water and in the presence of specific catalysts such as aliphatic or aromatic amines and trialkyl derivatives of arsenic, antimony or phosphorus. Sulfuric acid and boron trichloride or the mercaptides of copper or aluminum can also be used as catalysts. In addition, compounds containing the structural element =N—CSS— or salts of this class of compounds, as well as inorganic alkali materials can be used as catalysts in this regard too.

The art is also aware of the technique of adding common fillers in various amounts to the polymerizates either before or during the production of formed bodies from the polymerizates in order to dilute or extend the quantity of polymerizate used as well as to improve the mechanical properties of the finished products.

It has now been unexpectedly found that the polymerization of formaldehyde and lower molecular weight polymers of formaldehyde can be very greatly accelerated my the presence of commonly known filling agents in catalytic amounts during the polymerization process. According to the present invention it is preferable to so proceed that the catalytically effective fillers, preferably active fillers, are suspended in an inert medium which is as free of water as possible and to introduce the formaldehyde compound to be polymerized into this suspension in gaseous form. The eupolyoxymethylenes will thereby be produced in good yields.

The catalytically effective fillers to be used according to the present invention include fine particle sized oxides which have been produced by the pyrogenic decomposition of suitable metal or metalloid compounds in an oxidizing or hydrolysing gas or vapor. Such oxides would include, for example, the oxides of aluminum, silicon, titanium and zirconium. Generally speaking, the fine particle sized oxides may be produced by vaporizing the suitable metal or metalloid compounds and igniting the vapors in the presence of more or less combustible quantities of the oxidizing or hydrolyzing gases under various reaction and recovery conditions. The sizes, shapes and form of the fine particle sized oxides obtained can usually be varied depending on the reaction conditions and recovery techniques employed.

Furthermore, fine particle sized carbon can also be used in the present invention as a catalyst with notable results. Among the different fine particle sized carbon products which are suited as active fillers in the present invention the following very finely particle sized carbon blacks are to be noted in particular because of their special effectiveness: "Printex U," an inking carbon black containing 5% volatile constituents and having an average particle size of about 250 A. and a surface area of about 115 m.$^2$/g.; "Special Black IV," an oxidized Printex carbon black, the strongly oxidized carbon black "H 44" and "Regent Super," as well as other untreated carbon blacks and carbon blacks treated by liquid or gaseous oxidizing agents such as $H_2O_2$, nitric acid or ozone.

It is of importance for the catalytic properties of the filter materials to be used in the present invention that they are very susceptible to being wetted by the reaction medium. In many cases it may be advisable in this regard to subject the raw filler materials to a treatment which improves their wettability. Of the various possibilities for treatment of the fillers to improve their catalytic properties, the preferable procedure is to impregnate the filler with solutions of commonly known polyoxymethylene producing catalysts. The impregnating process can be conducted in such a fashion that the active or subsequently activated filler is treated with dilute water free solutions of catalysts known to the art, whereby an unusually fine dispersion of the known catalysts is obtained on the fine particle sized filler. When the polymerization process of the present invention is conducted in an inert reaction medium the suspended, catalytically effective filler is efficient even in amounts of 0.0005 g. per liter of the reaction medium although this amount can be increased, in suitable cases, up to 30 g. per liter. It is expedient that the filler catalyst of the present invention be added in larger amounts when it is to be used with a co-catalyst known to the art and if a polymerizate having an increased filler content is desired. Any catalyst known to the art for its utility in the production of polyoxymethylenes from formaldehyde or lower molecular weight oligomers of formaldehyde can be used as a catalyst in conjunction with the catalysts of the present invention. The polymerization process of the present invention can also be conducted using, as the catalyst system, a mixture of active fillers, whereby the catalytic properties of the active filler components are additive.

As was mentioned above, it is preferable to conduct the process of the present invention in an inert reaction medium. Such inert mediums would include hydrocarbon and hydrocarbon halide solvents, such as benzene, ethylene, trichloride, carbon tetrachloride, decahydronaphthalene, gasoline, toluene and carbon disulfide, as well as mixtures of these solvents, as well as, generally, all such solvents which do not dissolve either the formaldehyde compound being polymerized or the polymerizate and which are not hydroscopic.[1] Mixtures of benzine and ethylene trichloride are particularly noteworthy in this regard. It is advantageous, moreover, to use the active filler catalyst in the form of the finest particle size possible so that it can be maintained in the reaction medium in the form of a homogeneous suspension with the aid of a suspension stabilizer. It is possible to use in this regard, as suspension stabilizers or emulsifiers, commercially available materials which are composed of polyethylene glycol ethers, alkylphenyl-polyglycol ethers or carboxylic acid polyglycol esters.

The particle size of the different types of active carbon to be used in the present invention can vary between 150 and 5000 A. depending upon the reactants and operating conditions. Silicon dioxide (Aerosil) produced in the gas phase by burning vaporized carbon tetrachloride in a flame in the presence of a hydrogen containing gas has a particle size of 40 to 200 A. whereas wet precipitated silicic acid particles have a larger particle size of up to 0.1 mm. Pyrogenically produced aluminum oxide has approximately the same particle size as the Aerosil silica and wet precipitated $Al_2O_3$ can have particle sizes up to 0.15

---
[1] Hydrogen halides may also impart an additional initiator effect.

mm., which corresponds, in size, to a material which has passed through a 100 mesh sieve (as in Example 10).

The process of the present invention is preferably carried out by introducing gaseous monomeric water free formaldehyde, at room temperature, into the suspension of the active filler catalyst in the inert solvent. The monomeric formaldehyde can be obtained by customary procedures from paraformaldehyde or other formaldehyde oligomers and preferably from highly purified trioxane. The introduction of the gaseous monomeric formaldehyde into the active filler catalyst suspension system can be expediently facilitated with the aid of an inert carrier gas, for example, nitrogen or a carrier vapor, for example, vapors of the solvent being used. In carrying out the process of the present invention it is preferable to use practically water free monomeric formaldehyde and water free solvents. Depending on the active filler catalyst being used, the maximum water tolerance content of the reaction medium can vary between 30 and 100 p.p.m. of water. The water content of the entire reaction system, however, should not exceed 0.5%.

The most preferable temperature range for the polymerization reaction lies between +10 and +50° C. The reaction, however, can also be conducted within the temperature range of from −100° C. up to the boiling point of the solvent or solvent mixture being used.

The polymerizates obtained by the process of the present invention have an average molecular weight of 20,000 to 100,000. The formed bodies produced from these polymerizates have outstanding mechanical properties in addition to good thermal stability. The properties of the polymerizates themselves, as well as the bodies formed therefrom, can be even further improved if materials known to the art, such as antioxidants, polyamides, acid amides, agents used for protection against light or even additional noteworthy quantities of known fillers selected from among those having some or no catalytic properties are added to the polymers either before or while they are being processed into formed bodies.

The following examples are merely illustrative of the present invention and are not intended as a limitation thereon.

*Example 1*

0.3 g. of carbon black (Printex U) were so finely distributed in 2 liters of water free benzine with the aid of a dispersing device that a suspension resulted. Monomeric gaseous water free formaldehyde was then introduced into this suspension until approximately ¼ of its volume was filled with the resulting grey-black polymeric precipitate. After about 3 hours, approximately 80 g. of the polymer had formed and the reaction temperature had risen from room temperature to about 39° C. The yield of the polymer was 80 g. or 40% of the theoretical with reference to the original paraformaldehyde from which the monomeric formaldehyde was formed. The polymer had a melting point range of 180–205° C. and had an average molecular weight of 37,000. The polymer itself without further additions thereto displayed a loss in weight of 40% by vaporization when heated in air at 200° C. for 20 minutes.

*Example 2*

0.05 g. of carbon black (Printex U) were suspended in 2 liters of benzine as described in Example 1. After water free monomeric gaseous formaldehyde had been introduced into this suspension for 2.5 hours, 59 g. of polymer of sandy consistency had precipitated. This amount corresponds to a yield of about 25% of the theoretical. The reaction temperature of the system rose from 20.5 to 36° C. during the course of the reaction. The average molecular weight of the polymer was 47,000. When the polymer was heated for 20 minutes, in air, at a temperature of 200° C. it suffered a vaporization loss of 42.4% in weight.

*Example 3*

0.3 g. of carbon black (Printex U) were pretreated with hydrogen peroxide, dried at a high temperature and then suspended in 2 liters of benzine. 52 g. of a loose polymerizate were obtained by introducing water free monomeric gaseous formaldehyde into the suspension for 1.5 hours. The yield was 26% of the theoretical. The average molecular weight of the polymer was 60,000. When heated at 200° C. for 20 minutes in air the polymer lost 19.4% of its weight by vaporization.

*Example 4*

0.3 g. of carbon black (Special Black IV) were extracted with xylene for 24 hours and then dried at a high temperature for several hours more. Thereafter, the carbon black thus treated was suspended in 2 liters of dry benzine and water free monomeric gaseous formaldehyde were then introduced into this suspension for 2 hours. A 27% by weight yield of a sandy polymerizate was thereby obtained. The reaction temperature climbed from 22 to 34° C. during the reaction. When heated at 200° C. for 20 minutes in air the polymer lost 48.5% in weight by vaporization.

*Example 5*

0.3 g. of carbon black (H 44) which had been previously extracted for 9 hours with xylene and then dried for three hours at 150° C. in a drying oven were suspended in 2 liters of benzine. Water free monomeric gaseous formaldehyde was then introduced into this suspension for 2.5 hours whereupon the temperature of the system rose from 21 to 40° C. and 93.5 g. of a sandy polymerizate precipitated out. The yield was 47% of the theoretical. The polymer had an average molecular weight of 55,000 and a melting point range of 180–210° C. When heated at 200° C. for 20 minutes in air the polymer suffered a loss in weight of 49.5% due to vaporization.

*Example 6*

5 g. of carbon black were treated with a solution of 0.05 g. of piperidine pentamethylene dithiocarbamate in 100 ml. of ethylene trichloride and were then suspended in a mixture of 2 liters of benzine and 0.12 liter of ethylene trichloride. Water free monomeric gaseous formaldehyde was then introduced into this suspension for 2 hours whereupon the temperature of the system rose from 23 to 46° C. 169 g. of a polymerizate precipitated out which had a carbon black content of about 3% and an average molecular weight of 51,000. The yield was 70% of the theoretical.

*Example 7*

10 g. of carbon black (Special Black IV) were digested with a solution of 0.02 g. of piperidine pentamethylene dithiocarbamate in 100 ml. ethylene trichloride and were then suspended in a mixture of 2 liters of benzine and 0.12 liters of ethylene trichloride. Upon the introduction of water free monomeric gaseous formaldehyde into the suspension the temperature of the system rose from 22.5 to 30.5° C. After about 40 minutes of continuous gaseous formaldehyde introduction, 29 g. of a polymerizate having an average molecular weight of 39,000 and a carbon black content of 34.6% was produced. The yield of 29 g. was 30% of the theoretical.

*Example 8*

5 g. of carbon black (Regent Super) were suspended in 1.8 liters of benzine after previously having been dried for 5 hours at 140° C. 104 ml. of ethylene trichloride were also added to the system and then water free monomeric gaseous formaldehyde was introduced thereto for one hour. After the temperature of the system had risen from 22 to 30° C., 35 g. of a dense polymeric mass were obtained which had a carbon black content of 14.3%. The yield was 20% of the theoretical and the average molecular weight of the polymer was 90,000.

Example 9

9 g. of carbon black (Regent Super) were treated as described in Example 8. After water free monomeric gaseous formaldehyde was introduced into the suspension system for one hour, 55 g. of a dense formaldehyde polymer were obtained. The polymer had a carbon black content of 16.3% and an average molecular weight of about 20,000.

Example 10

0.5 g. of activated aluminum oxide, which had been calcined at 300° C. and had a particle size capable of passing through a 100 mesh sieve were suspended in a mixture of 1.8 liters of benzine and 114 ml. of ethylene trichloride with the aid of a suspension stabilizer (tetraethylene glycol dimethyl ether). Water free monomeric gaseous formaldehyde was then introduced into this suspension for 2 hours and 15 minutes. 60.5 g. of a loose, flocculent polymer was thereby obtained. The polymer had an average molecular weight of 90,000. The yield was 30% of the theoretical.

Example 11

The process of Example 10 was repeated except that the aluminum oxide was subjected to a prior 8 hour treatment by the xylene method for the removal of moisture and thereafter dried for an additional 14 hours at 140° C. While the monomeric formaldehyde was introduced into the suspension system the temperature rose from 22 to 41° C. and 71.5 g. of a dense, sandy polyoxymethylene was obtained. The yield was 36% of the theoretical. The average molecular weight of the polymer was 56,000. When heated at 200° C. for 20 minutes in air the polymer suffered a loss in weight of 47% due to vaporization.

Example 12

5 g. of the active $Al_2O_3$ used in Example 10 were suspended in a mixture of 1.8 liters of benzine and 114 ml. of ethylene trichloride with the aid of a suspension stabilizer (tetraethylene glycol dimethyl ether). Water free monomeric gaseous formaldehyde was then introduced into this suspension system for 1 hour. The temperature of the reaction system rose from 21 to 56° C. and 119 g. of a polyoxymethylene having an average molecular weight of 73,000 were thereby obtained. The $Al_2O_3$ content of the polymer was 4.2%.

Example 13

2 g. of highly dispersed silicon dioxide (Aerosil) were suspended in a mixture of 2 liters of benzine and 116 ml. of ethylene trichloride. Thereafter, water free monomeric gaseous formaldehyde was introduced into the suspension for a half hour. 20 g. of a fine powdered polyoxymethylene were thereby produced.

Example 14

2 g. of Aerosil were charged with 10 mg. of piperidine pentamethylene dithiocarbamate by having the two materials dispersed in 50 ml. of ethylene trichloride. The mixture was then suspended in a solvent system composed of 1.8 liters of benzine and 104 ml. of ethylene trichloride. Water free monomeric gaseous formaldehyde was then introduced into the suspension system for a half hour. 67 g. of a polyoxymethylene, which had good thermal stability properties were thereby produced. The yield was 50%.

In the foregoing examples the yields were based on the respective amounts of paraformaldehyde originally used to produce the water free monomeric gaseous formaldehyde.

In regard to the polymerizates obtained in Examples 13 and 14, it is to be mentioned that no molecular weight determinations could be conducted on these products since the use of the particular active filler catalyst employed in these examples led to a thixotropic effect in the solutions.

When testing the polymerizates produced in these examples for vaporization losses the polymers were heated for 20 minutes at 200° C. in the air.

For practical reasons, the water free monomeric gaseous formaldehyde employed in these examples was partially diluted with small amounts of an inert gaseous carrier such as air or nitrogen. The amount of carrier gas used was in the range of about 1 to 10%.

The monomeric gaseous formaldehyde was produced by decomposing paraformaldehyde in a rate of approximately 300 to 400 g. per hour. This yields about 70% gas resulting 210 to 280 g. gas per hour or 1400 to 2000 liters per hour.

The polymerization mostly was carried out at room temperature, i.e. at approximately 20° C. During the polymerization the reaction temperature climbs to max. 40° C. which depends on the kind of the container used, on the quantity of solvent, on the rate of gas flow and the like.

Unless otherwise stated, the polymers had melting point ranges of 180 to 200° C.

The fillers used as catalysts may also impart an additional reinforcing effect to the polymer. Treating the fillers with diluted water free solutions of catalysts known in the art to improve the catalytic properties, the fillers adsorb parts of the additional catalysts in the range of their adsorption capacity.

The carbon blacks used in Examples 4 and 5 were dehydrogenated by azeotropic distillation with xylene and thereafter dried at a high temperature of about 130 to 150° C. in a drying oven.

Catalysts which may be used to improve the catalytic properties of the fillers are all catalysts commonly known to produce polyoxymethylenes, e.g. aliphatic or aromatic amines and trialkyl derivatives of arsenic, antimony or phosphorus and further more mercaptides of copper or aluminium, redox systems, elemental sulphur, hydroxides of alkali or earth alkali metals, metal organic compounds, metal salts, carbonyl compounds of heavy metals, and especially compounds with the structural element $$=N-CSS-$$

or salts of this class of compounds. Quaternary bases or salts may also be used.

We claim:

1. A process for the production of polyoxymethylenes comprising a polymerizing a formaldehyde compound selected from the group consisting of monomeric formaldehyde and lower molecular weight formaldehyde oligomers under substantially water free conditions and in the presence of catalytic quantities of a finely divided carbon black as a catalytic material.

2. A process as in claim 1 in which said catalytic material is an active filler.

3. A process as in claim 1 in which said catalytic material is a carbon black having an average particle size of approximately 150 to 5000 A.

4. A process as in claim 1 in which said catalytic material is used in combination with at least one other formaldehyde polymerization catalyst.

5. A process as in claim 4 in which said catalytic material is an active filler which has been treated with dilute, water free solutions of said other catalysts.

6. A process as in claim 1 in which said catalytic material is suspended in an organic solvent system and said formaldehyde compound is introduced into said solvent system in a gaseous form.

7. A process as in claim 6 in which the reaction system contains no more than 0.5% water.

8. A process as in claim 6 in which said solvent system is a mixture of gasoline and ethylene trichloride.

9. A process as in claim 6 in which said catalytic material is present in a quantity of between 0.001 to 50 g. per liter of said solvent system.

10. A process as in claim 6 in which said catalytic material is present in a quantity of between 0.005 to 30 g. per liter of said solvent system.

11. A process as in claim 1 in which said polymerization is conducted at a temperature of +10 to +50° C.

References Cited by the Examiner

UNITED STATES PATENTS 2,768,994  2/54  MacDonald _____ 260—67
2,795,571  6/57  Schneider _____ 260—67
3,030,338  4/62  Aries _____ 260—67

FOREIGN PATENTS 796,863  6/58  Great Britain.

OTHER REFERENCES

J. Walker: Formaldehyde (1953), page 179.

WILLIAM H. SHORT, *Primary Examiner.*

MILTON STERMAN, LOUISE P. QUAST, *Examiners.*